US012607914B2

(12) United States Patent
Tseng et al.

(10) Patent No.: US 12,607,914 B2
(45) Date of Patent: Apr. 21, 2026

(54) DEVICE HOLDER

(71) Applicant: ABILITY ENTERPRISE CO., LTD., New Taipei City (TW)

(72) Inventors: Cheng-Kuang Tseng, New Taipei City (TW); Yung-Tseng Yen, New Taipei City (TW); Che-Jen Hsu, New Taipei City (TW)

(73) Assignee: ABILITY ENTERPRISE CO., LTD., New Taipei City (TW)

( * ) Notice: Subject to any disclaimer, the term of this patent is extended or adjusted under 35 U.S.C. 154(b) by 378 days.

(21) Appl. No.: 18/123,774

(22) Filed: Mar. 20, 2023

(65) Prior Publication Data

US 2023/0305371 A1     Sep. 28, 2023

(30) Foreign Application Priority Data

Mar. 25, 2022    (TW) .................................. 111203117

(51) Int. Cl.
*G03B 17/56* (2021.01)
*F16M 11/18* (2006.01)
*F16M 13/02* (2006.01)

(52) U.S. Cl.
CPC ........... *G03B 17/561* (2013.01); *F16M 11/18* (2013.01); *F16M 13/022* (2013.01)

(58) Field of Classification Search
CPC ..... F16M 11/18; F16M 13/022; G03B 17/561
See application file for complete search history.

(56) References Cited

U.S. PATENT DOCUMENTS

| | | | | |
|---|---|---|---|---|
| 4,341,452 A * | 7/1982 | Korling | ................ | F16M 11/105 |
| | | | | 396/428 |
| 5,040,759 A * | 8/1991 | Wainwright | ......... | G03B 17/561 |
| | | | | 396/419 |
| 5,115,265 A * | 5/1992 | Swayze | .................. | G03B 17/04 |
| | | | | 396/424 |
| 7,440,027 B2 * | 10/2008 | Weaver | ................ | F16M 13/027 |
| | | | | 348/375 |
| 7,891,624 B2 * | 2/2011 | Dittmer | ................ | F16M 11/041 |
| | | | | 248/323 |
| 8,641,121 B2 * | 2/2014 | Schipper | ............. | B60R 11/0252 |
| | | | | 296/37.1 |
| 8,746,993 B2 * | 6/2014 | Sherwood | ............. | F16M 13/04 |
| | | | | 396/419 |
| 8,876,070 B2 * | 11/2014 | Liu | ........................ | F16M 11/24 |
| | | | | 248/398 |
| 9,364,081 B1 * | 6/2016 | Haymond | ............ | A47B 23/044 |
| 9,644,783 B2 * | 5/2017 | Rinner | .................. | F16M 11/38 |
| 9,712,730 B2 * | 7/2017 | Phillips | .................. | F16M 11/14 |

(Continued)

FOREIGN PATENT DOCUMENTS

WO     WO-2011044075 A2 *   4/2011   ............... A45F 5/02

*Primary Examiner* — Monica E Millner
(74) *Attorney, Agent, or Firm* — Innovation Counsel LLP

(57)     ABSTRACT

A device holder includes a base, a pivot and a front cover. The base has a bearing portion. The front cover has a pressing portion and is pivotally disposed on the base by the pivot. When the device holder is in a closed state, the bearing portion and the pressing portion form an accommodation space. The front cover of the device holder provided by the present invention may rotate relative to the base to be open, so as to adjust the angle of the electronic device or accompanying object accommodated therein.

16 Claims, 7 Drawing Sheets

(56)  References Cited

U.S. PATENT DOCUMENTS

| 11,310,399 | B2 * | 4/2022 | Phillips | H04N 23/51 |
| 12,310,763 | B2 * | 5/2025 | Hu | F16M 11/125 |
| 2001/0040109 | A1 * | 11/2001 | Yaski | G06F 1/1626 |
| | | | | 206/320 |
| 2006/0007551 | A1 * | 1/2006 | Sakurai | G03B 11/041 |
| | | | | 359/611 |
| 2007/0262112 | A1 * | 11/2007 | Butler | A45F 5/00 |
| | | | | 224/669 |
| 2014/0263939 | A1 * | 9/2014 | Rinner | F16M 11/105 |
| | | | | 248/688 |
| 2014/0265185 | A1 * | 9/2014 | Mersky | B62B 3/1428 |
| | | | | 248/580 |
| 2015/0286115 | A1 * | 10/2015 | Koch | F16M 11/2078 |
| | | | | 248/230.4 |
| 2017/0205686 | A1 * | 7/2017 | Bingleman | G03B 17/55 |
| 2020/0326611 | A1 * | 10/2020 | Gelas | F16M 11/2021 |
| 2023/0291823 | A1 * | 9/2023 | Chen | F16M 11/2014 |

* cited by examiner

100

120

130

110

141(140)

113

114

114

113

141(140)

100

120

130

110

10

100

10

130

110

120

124

124

142(140)

142(140)

AS

φ2

122r    122    122r

120

110

112

φ1

DEVICE HOLDER

This application claims the benefit of Taiwan application Serial No. 111203117, filed Mar. 25, 2022, the subject matter of which is incorporated herein by reference.

TECHNICAL FIELD

The present invention relates in general to a holder, and more particularly to a device holder.

BACKGROUND

As the use of electronic devices, such as cameras, video cameras, monitors, sports cameras, webcams, dashcams and rear view cameras, becomes more widespread, electronic devices are used everywhere in our daily lives.

However, for some non-portable devices, they can only be installed in a specific environment and it is not easy to adjust the camera angle after installation, which troubles the user.

SUMMARY

The present invention relates to a device holder. The front cover may rotate relative to the base to be open, so as to adjust the angle of the electronic device or accompanying object accommodated therein.

The present invention provides a device holder including a base, a pivot and a front cover. The base has a bearing portion. The front cover has a pressing portion and is pivotally disposed on the base by the pivot. When the device holder is in a closed state, the bearing portion and the pressing portion form an accommodation space.

The present invention provides a device holder including a base, a front cover, a pivot and an engaging structure. The base has a bearing portion. The front cover has a pressing portion, and the pressing portion and the bearing portion form an accommodation space. The pivot is pivotally connected to one side of the base and the front cover. The engaging structure is connected to another side of the front cover and the base.

The present invention provides a device holder for holding an electronic device, the device holder including a base, a front cover, a pivot and a mount bracket. The base has a bearing portion and a pivot bump. The front cover has a pressing portion. The electronic device is accommodated in an accommodation space between the pressing portion and the bearing portion. The pivot is pivotally connected to one side of the base and the front cover. The mount bracket is pivotally disposed on the base by the pivot bump.

The above and other aspects of the invention will become better understood with regard to the following detailed description of the preferred but non-limiting embodiment(s). The following description is made with reference to the accompanying drawings.

DETAILED DESCRIPTION

Detailed descriptions of each embodiment of the present invention are disclosed below with reference to accompanying drawings. Apart from the said detailed descriptions, any embodiments in which the present invention can be used as well as any substitutions, modifications or equivalent changes of the said embodiments are within the scope of the present invention, and the descriptions and definitions in the claims shall prevail. Many specific details and embodiments are disclosed in the specification for anyone ordinary skilled in the art to comprehensively understand the present invention, not for limiting the present invention. Moreover, generally known procedures or elements are not disclosed to avoid adding unnecessary restrictions to the present invention.

Figures 1A, 1B:
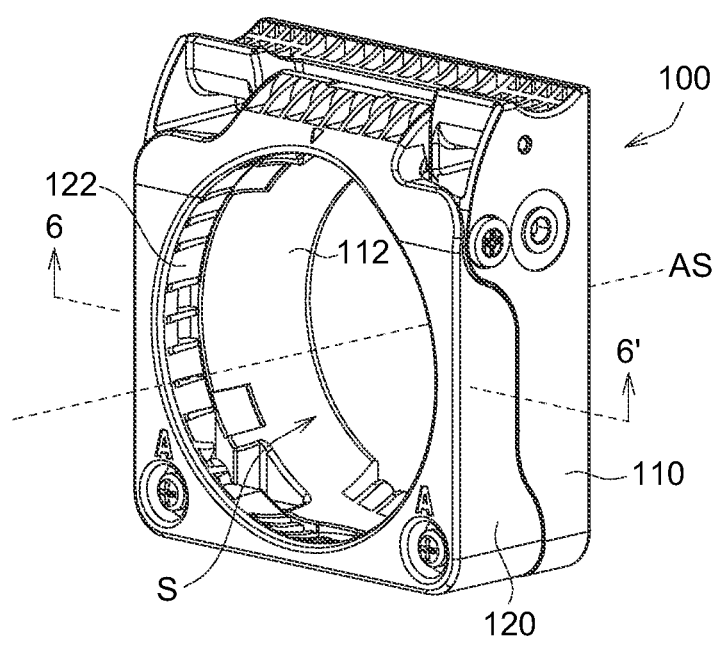
FIG. 1A is a schematic diagram of a device holder in a closed state according to one embodiment of the present invention.
FIG. 1B is a schematic diagram showing an image capturing module accommodated in the device holder of FIG. 1A according to one embodiment of the present invention.

FIG. 1A is a schematic diagram of a device holder 100 in a closed state according to one embodiment of the present invention. As shown in FIG. 1A, the device holder 100 may hold an electronic device or accompanying object, and allows the electronic device or accompanying object to be held securely in a pre-determined position without being dropped while being pushed, and without shifting in position or angle due to vibration. The present invention is illustrated by the example of an electronic device; however it is not intended to limit the present invention.

FIG. 1B is a schematic diagram showing an image capturing module 10 accommodated in the device holder 100 of FIG. 1A according to one embodiment of the present invention.

Referring to FIG. 1A and FIG. 1B, the present embodiment is illustrated by using the image capturing module 10 as the example of the electronic device or accompanying object, but the present invention is not limited thereto. In the example, the image capturing module 10 may be accommodated in the device holder 100, and may be fixed in the device holder 100 after the orientation of the image capturing module 10 has been adjusted and set, so that the image capturing module 10 may capture images in a fixed orientation by the device holder 100. The image capturing module 10 may be a camera, a video camera, a monitor, a sports camera, a webcam, a dashcam, a rear view camera, etc., but the present invention is not limited thereto.

FIGS. 2-5 show the assembly process for disposing the image capturing module 10 on the device holder 100.

Figure 2:
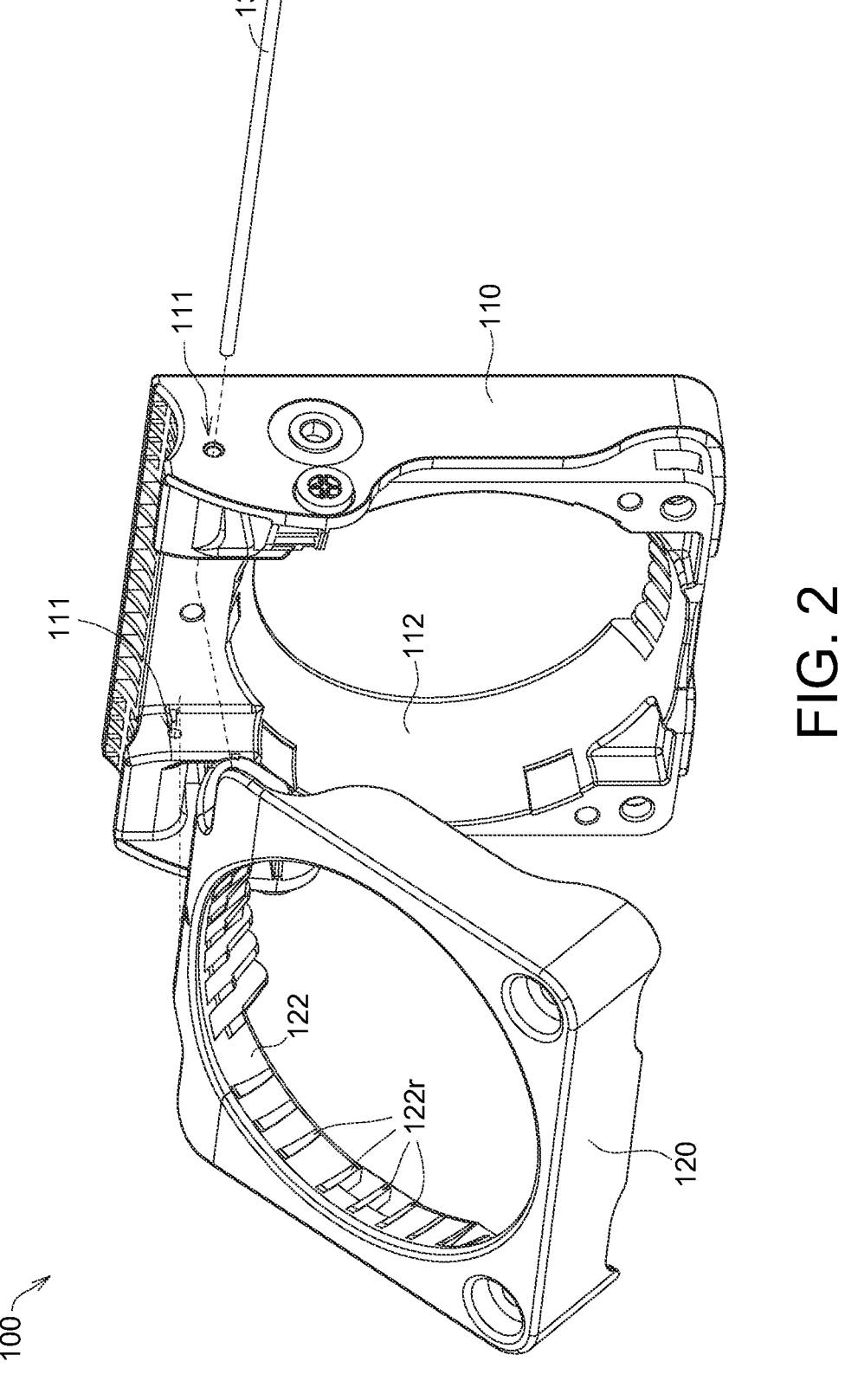
FIGS. 2-5 show the assembly process for disposing the image capturing module on the device holder.

Referring to FIG. 2, the device holder 100 at least includes a base 110, a front cover 120 and a pivot 130. The front cover 120 may be rotatably disposed on the base 110 by the pivot 130. The pivot 130 is disposed on one side of the base 110 and the front cover 120, and penetrates through the pivot portion 111 of the base 110 and the pivot portion of the front cover 120 (not indicated in the drawing), so that the front cover 120 and the base 110 may flip relative to each other.

Referring to FIG. 1A, FIG. 1B and FIG. 2, the base 110 has a bearing portion 112, and the front cover 120 has a pressing portion 122. When the device holder 100 is in the closed state, the bearing portion 112 and the pressing portion 122 form an accommodation space S in which the image capturing module 10 may be accommodated. The accommodation space S may penetrate through the front cover 120 and the base 110 along an axis AS. The axis AS may be substantially parallel to the optical axis of the image capturing module 10.

Figure 3:
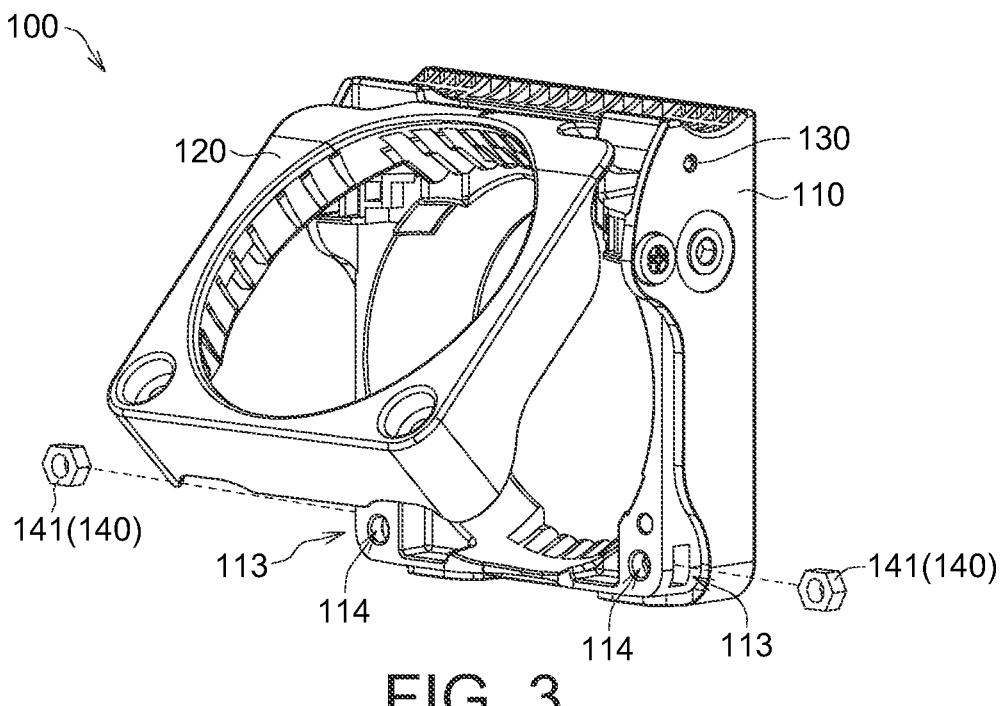
Figure 3:
Figure 4:
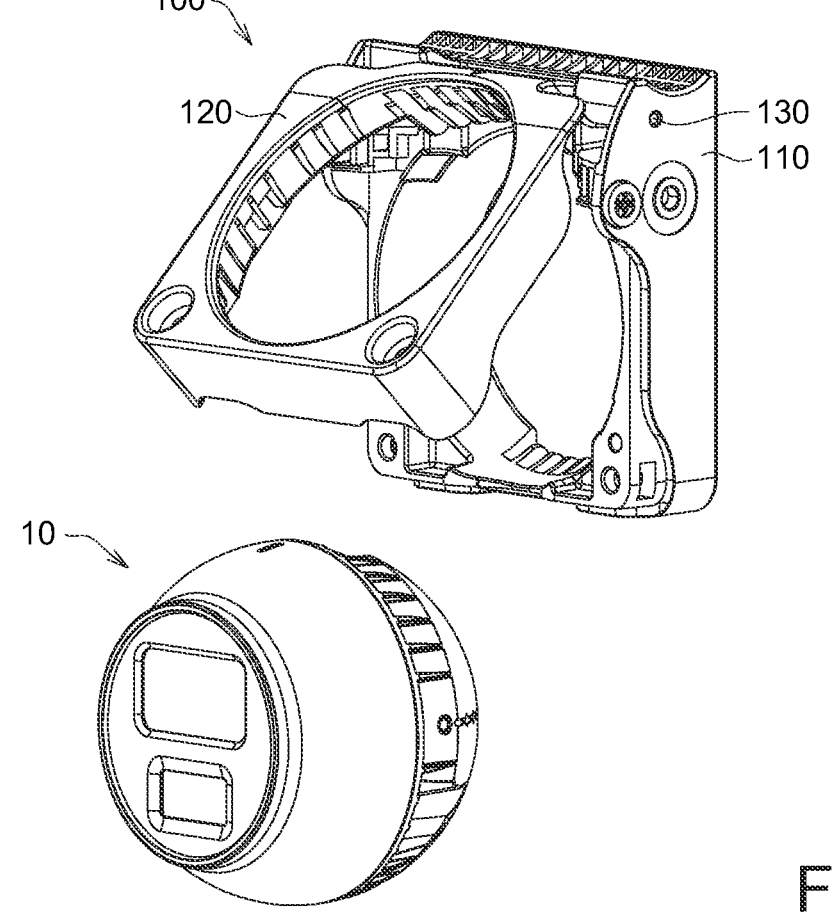
Figure 5:
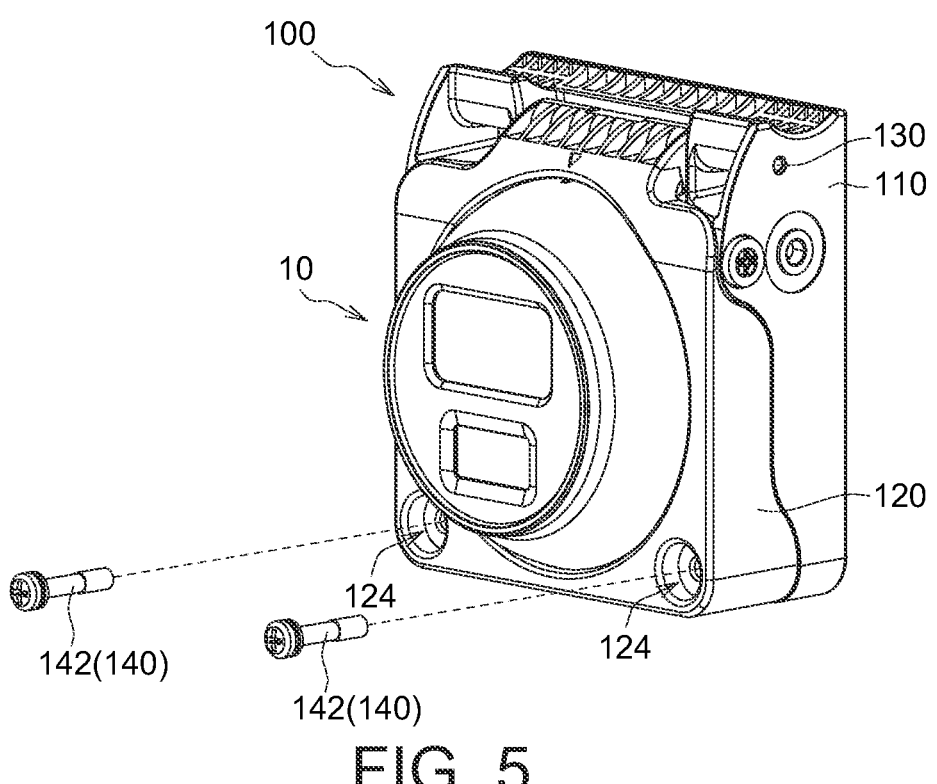

Referring to FIG. 3, FIG. 4 and FIG. 5, the device holder 100 may include an engaging structure 140, which is disposed between the front cover 120 and the base 110 and may connect the front cover 120 and the base 110. The engaging structure 140 may be disposed on the bottom portion of the base 110 and the front cover 120, and secure the front cover 120 to the base 110. In one specific embodiment, the engaging structure 140 may include a nut 141 and a screw 142 which may secure another side of the front cover 120 and the base 110 opposite to the pivot 130. As shown in FIG. 3, the nut 141 may be placed into the base 110 through the side notch 113 of the base 110 and aligned with the mounting hole 114 of the base 110.

As shown in FIG. 4, when the front cover 120 and the base 110 flip relative to each other by the pivot 130 to be in a flip-upwards state, the image capturing module 10 may be placed between the front cover 120 and the base 110 through the space created by the flipping of the front cover 120 and the base 110.

Referring to FIG. 3 and FIG. 5, the screw 142 may fit through the mounting hole 124 of the front cover 120 and the mounting hole 114 of the base 110, and be secured to the nut 141. However, the engaging structure 140 of the present invention is not limited to the above. For example, in another embodiment, the engaging structure 140 may be a snap-fit element disposed on the front cover 120 and the base 110, respectively.

Referring to FIG. 1A, FIG. 1B and FIG. 2, when the image capturing module 10 is accommodated in the accommodation space S, the image capturing module 10 may be supported by the bearing portion 112 of the base 110. Furthermore, the pressing portion 122 of the front cover 120 may press against the image capturing module 10. In one specific embodiment, the pressing portion 122 may include a plurality of protruding ribs 122*r*. Once the engaging structure 140 secures the front cover 120 to the base 110, the ribs 122*r* may press onto the surface of the image capturing module 10 to secure the image capturing module 10 in the accommodation space S and to enhance the stability of the fixation. In some embodiments, the rib 122*r* may include an elastic material, for example, the material including plastic, rubber or foam, or a combination of at least two of plastic, rubber and foam. If the device holder 100 is disposed on a system that moves, shakes or vibrates frequently, such as a car, the elastic material of the rib 122*r* may further absorb the effects of movement, shaking or vibration on the image capturing module 10.

The surface of the bearing portion 112 may be adapted to the outer surface of the image capturing module 10 so that the image capturing module 10 may be securely supported by the bearing portion 112. In one specific embodiment, the bearing portion 112 may have a curved surface; correspondingly, the end of the image capturing module 10 (opposite to the end for capturing image) may have a spherical shape. Thus, the image capturing module 10 may rotate at will on the curved surface of the bearing portion 112 by its spherical surface. For example, the user may slightly loosen the screw 142 of the engaging structure 140, allowing the screw 142 to be separated from the nut 141 so that the pressing portion 122 no longer presses against the image capturing module 10. At this point, the user may rotate the image capturing module 10, adjust it to the desired camera angle and then secure the screw 142 to the nut 141 to fix the orientation of the image capturing module 10.

It should be understood that the present invention is not limited to the aforementioned conditions for adjusting the orientation of the image capturing module 10. In other embodiments, the pressing portion 122 does not completely press against the image capturing module 10. For example, the screw 142 does not fully fasten to the nut 141; or, the front cover 120 and the base 110 are combined by snap-fit element. In such cases, there may still be some tolerance between the image capturing module 10 and the pressing portion 122 for the user to rotate the image capturing module 10 to enable fine adjustment of the camera angle.

Figure 6:
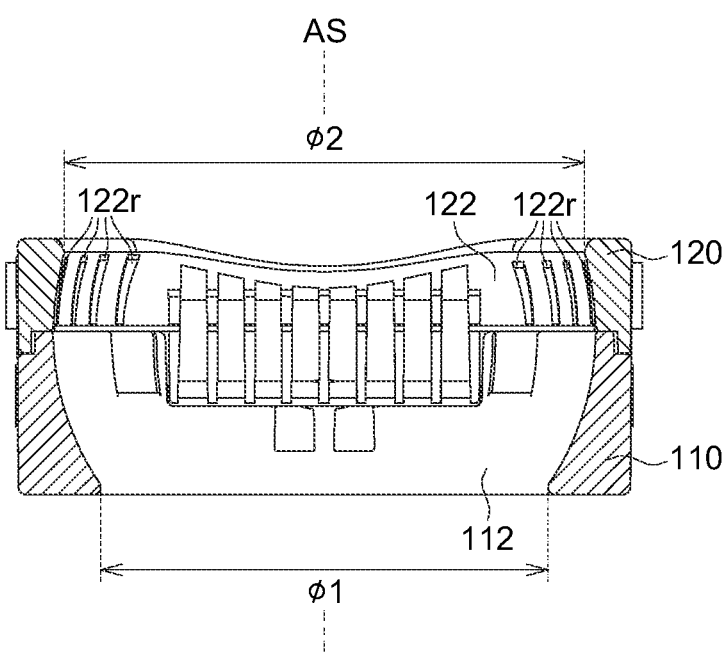
FIG. 6 is a cross-sectional view along a cutting plane line 6-6' shown in FIG. 1A.

FIG. 6 is a cross-sectional view along a cutting plane line 6-6' shown in FIG. 1A. Referring to FIG. 1 and FIG. 6, the inner diameters of the bearing portion 112 and the pressing portion 122 may vary along the axis AS. For the bearing portion 112, the farther away from the front cover 120 in the axis AS, the smaller the inner diameter; thus the bearing portion 112 has the smallest inner diameter $\phi 1$ at the farthest away from the front cover 120. Therefore, when the image capturing module 10 is accommodated in the accommodation space S, the bearing portion 112 may prevent the image capturing module 10 from falling out of this end by its smallest inner diameter $\phi 1$. For the pressing portion 122, the farther away from the base 110 in the axis AS, the smaller the inner diameter; thus the pressing portion 122 has the smallest inner diameter $\phi 2$ at the farthest away from the base 110. Therefore, when the image capturing module 10 is accommodated in the accommodation space S, the pressing portion 122 may prevent the image capturing module 10 from falling out of this end by its smallest inner diameter $\phi 2$. Moreover, as the pressing portion 122 gets farther from the base 110, the tapered change of the inner diameter of the pressing portion 122 may be beneficial to press against the image capturing module 10.

Figure 8:
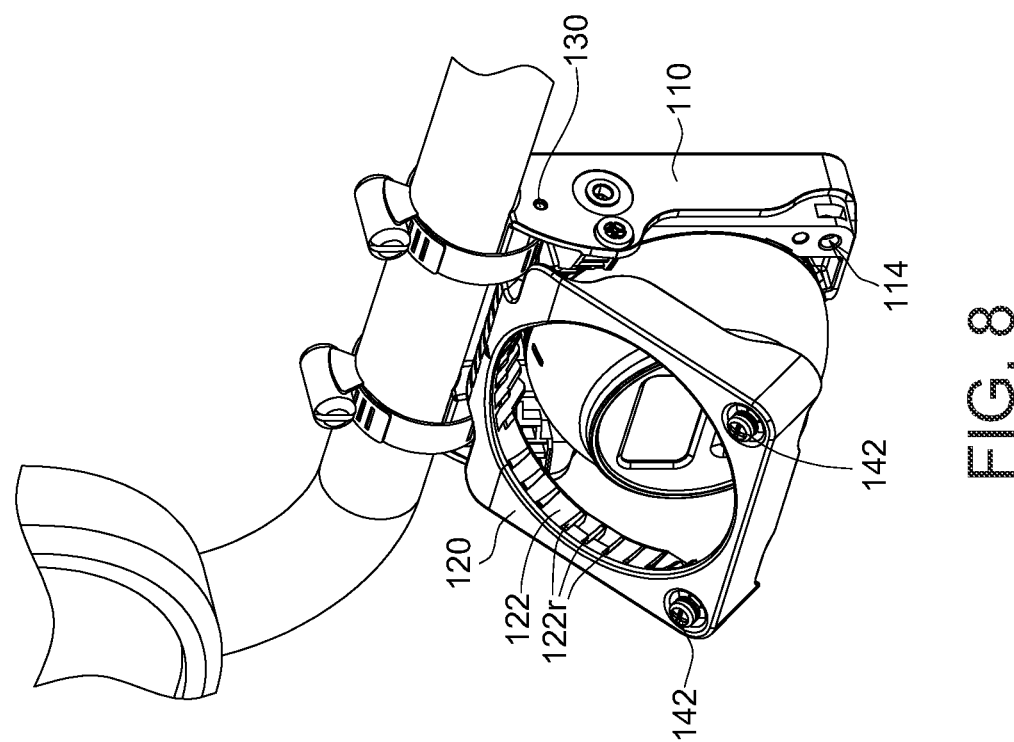
FIG. 8 shows a schematic diagram for adjusting the camera angle of the image capturing module shown in FIG. 7.
Figure 7:
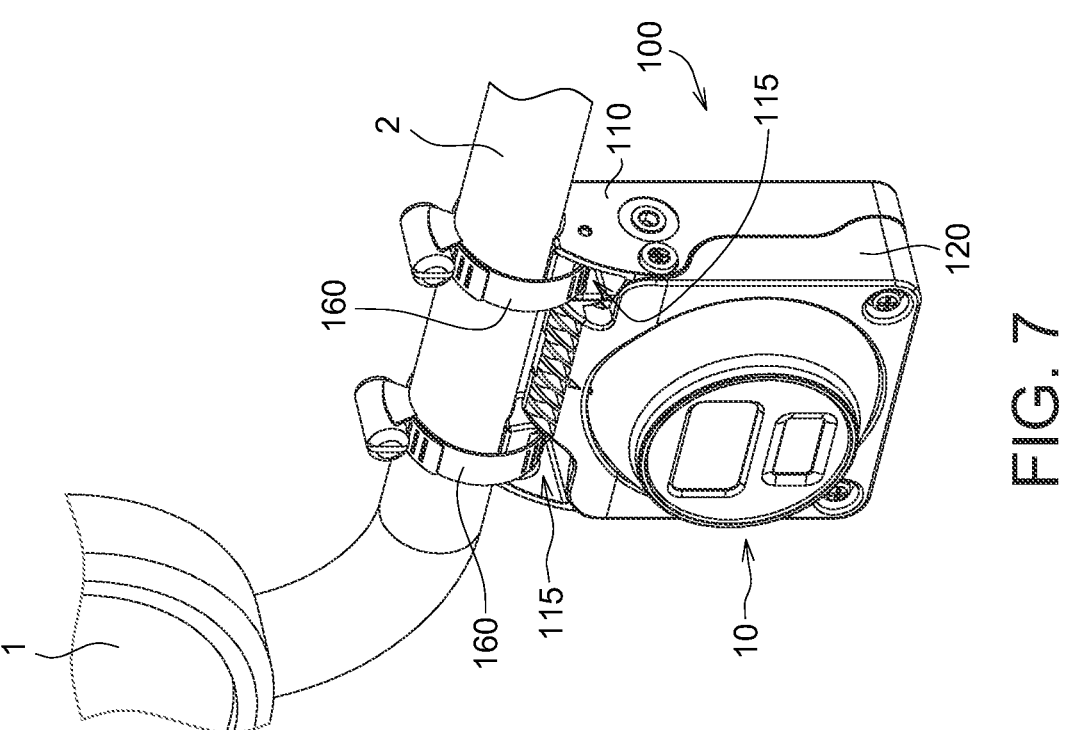
FIG. 7 is an application example of the device holder according to another embodiment of the present invention.

FIG. 7 is an application example of the device holder 100 according to another embodiment of the present invention; FIG. 8 shows a schematic diagram for adjusting the camera angle of the image capturing module 10 shown in FIG. 7.

Referring to FIG. 7, in one embodiment, the device holder 100 may be disposed on the rod 2 of the side view mirror 1. Here, the device holder 100 may include a tie 160 disposed on the base 110. For example, the base 110 may have a through hole 115, and the tie 160 may pass the through hole 115 and be tied to the rod 2 of the side view mirror 1. In this way, the user may observe the side or rear of the vehicle through the image capturing module 10 while driving.

Referring to FIG. 8, if the user wants to adjust the camera angle of the image capturing module 10 to further observe the dead zone at the side or rear of the vehicle, the user does not need to remove the device holder 100 from the rod 2 of the side view mirror 1, but simply loosens the screw 142 in place and adjusts the camera angle of the image capturing module 10 in the same manner as described above. After the adjustment is complete, the screw 142 is then secured to fix the orientation of the image capturing module 10.

Figure 9:
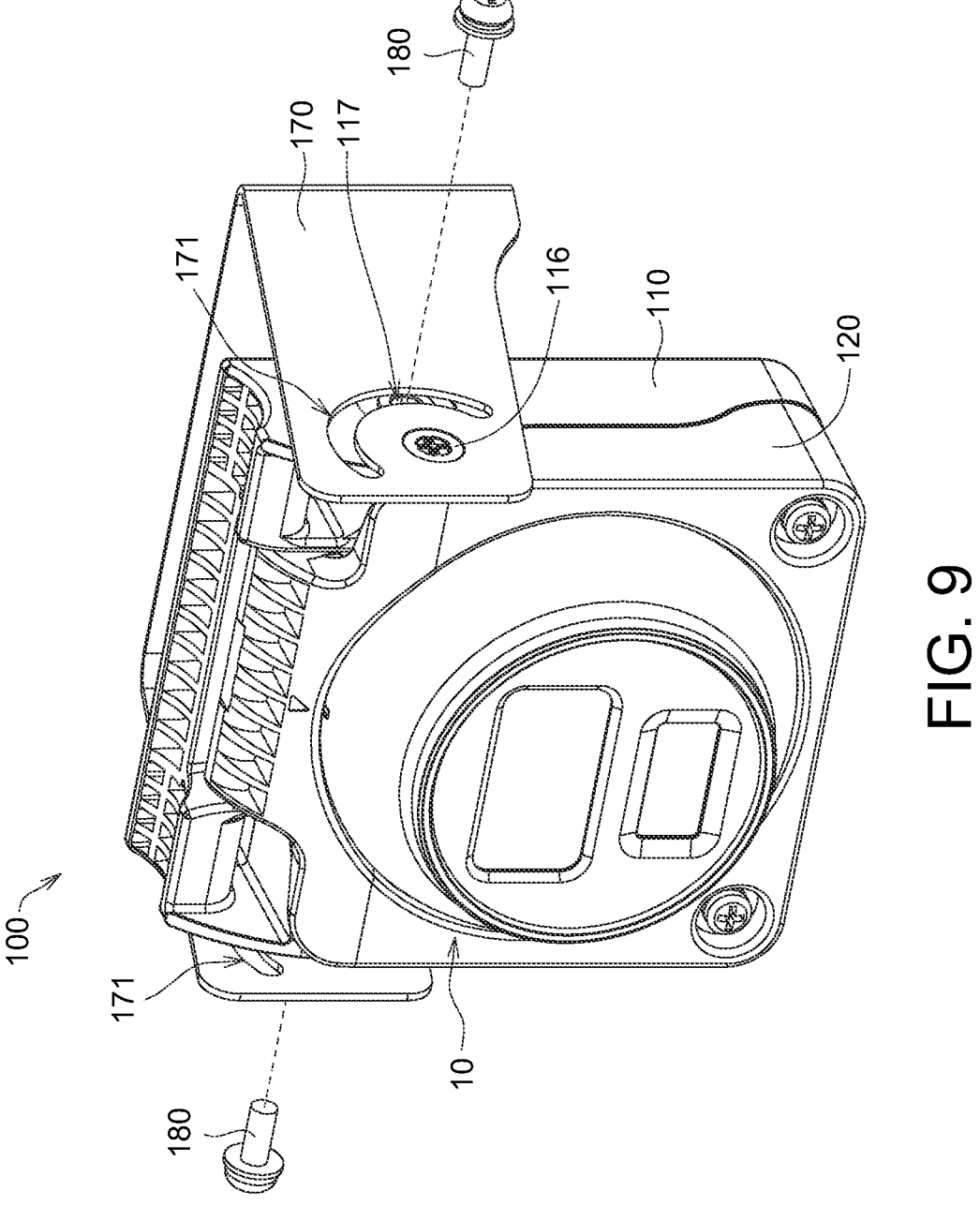
FIG. 9 is an exploded view of a device holder according to still another embodiment of the present invention.
Figure 10:
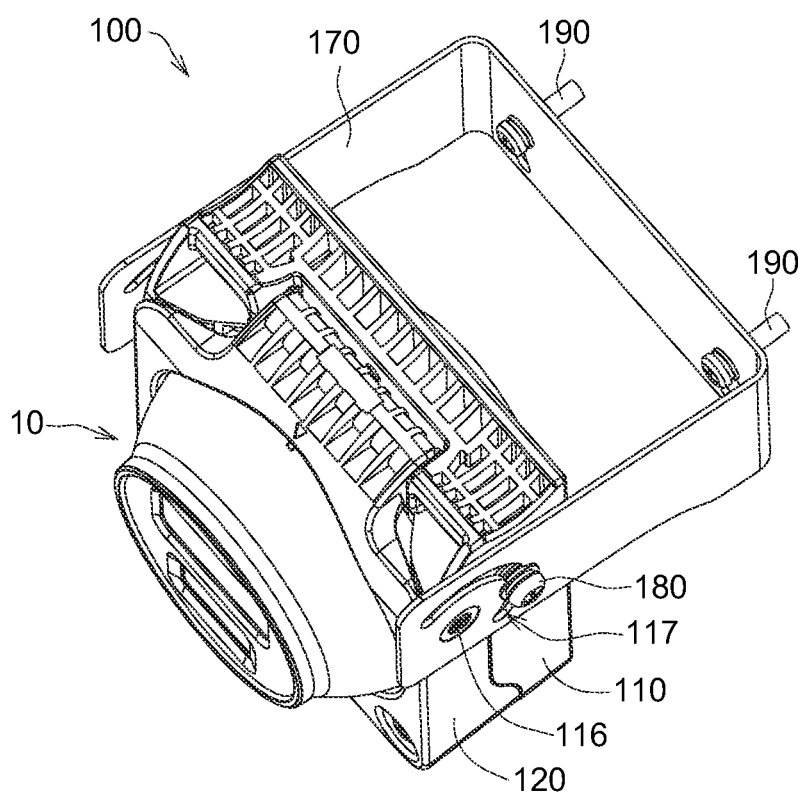
FIG. 10 shows an application example of the device holder shown in FIG. 9.
Figure 11:
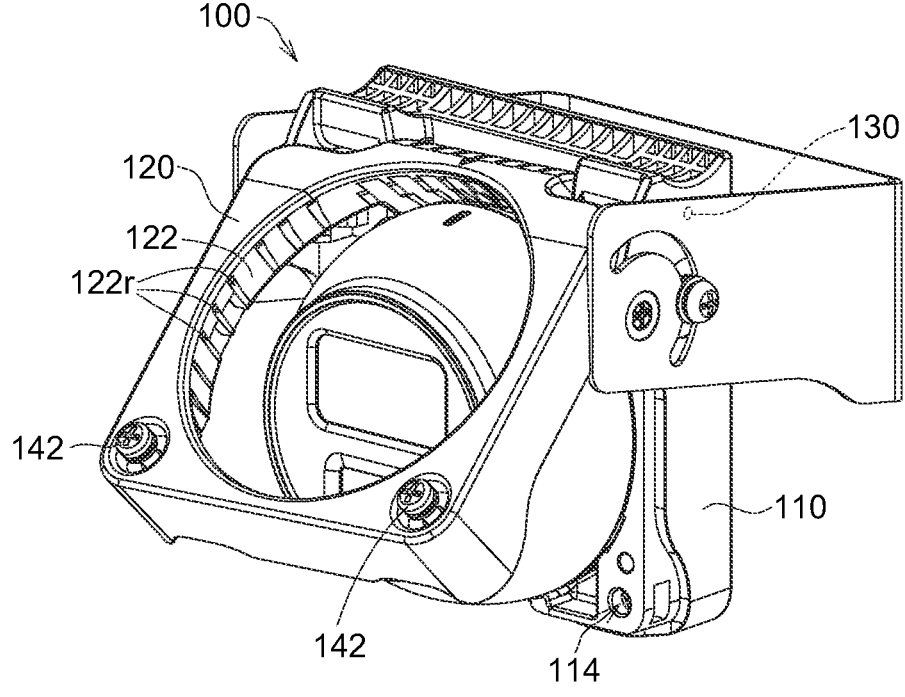
FIG. 11 shows a schematic diagram for adjusting the camera angle of the image capturing module shown in FIG. 10.

FIG. 9 is an exploded view of a device holder 100 according to still another embodiment of the present invention; FIG. 10 shows an application example of the device holder 100 shown in FIG. 9; FIG. 11 shows a schematic diagram for adjusting the camera angle of the image capturing module 10 shown in FIG. 10.

Referring to FIG. 9, the device holder 100 may include a mount bracket 170, and the base 110 may further have a pivot bump 116. The mount bracket 170 is disposed on the base 110 by the pivot bump 116, and the mount bracket 170 and the base 110 may be rotatable relative to each other by the pivot bump 116. The device holder 100 may further include a fixing member 180. The mount bracket 170 may be fixed at any angle relative to the base 110 by the fixing member 180. For example, the fixing member 180 may be a screw which may fit through the guide slot 171 of the mount bracket 170 and be secured to the thread hole 117 of the base 110. The guide slot 171 is an arc-shaped slot with center at the pivot bump 116. Thus, to change the rotation angle of the mount bracket 170 relative to the base 110, the user may release the fixing member 180 to allow the mount bracket 170 to rotate relative to the base 110. Once the desired angle has been determined, the user may then secure the fixing member 180 to the base 110 again.

However, the fixing member 180 of the present invention is not limited to the screw. For example, the fixing member 180 may be a combination of a protruding block and a recess, wherein the recess may be formed in the guide slot 171 of the mount bracket 170 and the protruding block may be formed on the base 110. In one embodiment, there may be a plurality of recesses in the guide slot 171 and the protruding block may optionally be combined with one of the recesses so that there is a plurality of angular adjustments between the mount bracket 170 and the base 110.

Referring to FIG. 10, in one embodiment, the device holder 100 may be disposed on any object with a flat surface by the mount bracket 170. For example, the device holder 100 may be disposed on any flat surface behind the truck by the mount bracket 170. Here, the device holder 100 may be fixed to a selected flat surface by a connecting member 190 connecting the mount bracket 170 to the selected flat surface. The connecting member 190 may be a screw, but the present invention is not limited thereto. In this way, the user may observe the rear of the vehicle through the image capturing module 10 while driving.

Referring to FIG. 11, if the user wants to adjust the camera angle of the image capturing module 10 to further observe the dead zone at the rear of the vehicle, the user does not need to remove the device holder 100 from the selected flat surface, but simply loosens the screw 142 in place and adjusts the camera angle of the image capturing module 10 in the same manner as described above. After the adjustment is complete, the screw 142 is then secured to fix the orientation of the image capturing module 10.

It will be apparent to those skilled in the art that various modifications and variations can be made to the disclosed embodiments. It is intended that the specification and examples be considered as exemplary only, with a true scope of the present invention being indicated by the following claims and their equivalents.

What is claimed is:

1. A device holder comprising:
   a base having a pivot bump, a bearing portion and a first closed hole penetrating therethrough;
   a mount bracket pivotally disposed on the base by the pivot bump;
   a pivot; and
   a front cover having a pressing portion and a second closed hole penetrating therethrough, the front cover is rotatably disposed on the base by the pivot, the bearing portion and the pressing portion forming an accommodation space defined by the first closed hole and the second closed hole, and an axis passing through the first closed hole and the second closed hole in response to the front cover being fixed to the base.

2. The device holder according to claim 1, wherein the accommodation space penetrates through the front cover and the base along the axis, the inner diameter of the bearing portion decreases as the bearing portion extends farther along the axis away from the front cover, and/or the inner diameter of the pressing portion decreases as the pressing portion extends farther along the axis away from the base.

3. The device holder according to claim 1, wherein the pressing portion comprises a plurality of protruding ribs.

4. The device holder according to claim 3, wherein each of the protruding ribs comprises an elastic material.

5. The device holder according to claim 1, further comprising an engaging structure disposed between the front cover and the base.

6. The device holder according to claim 1, wherein the bearing portion is provided with a curved surface.

7. The device holder according to claim 1, further comprising a fixing member, and the mount bracket is fixed at any angle relative to the base by the fixing member.

8. A device holder comprising:
   a base having a pivot bump, a bearing portion and a first closed hole penetrating therethrough;
   a mount bracket pivotally disposed on the base by the pivot bump;
   a front cover having a pressing portion and a second closed hole penetrating therethrough, the pressing portion and the bearing portion forming an accommodation space defined by the first closed hole and the second closed hole, and an axis passing through the first closed hole and the second closed hole in response to the front cover being fixed to the base;
   a pivot pivotally connected to one side of the base and the front cover; and
   an engaging structure connected to another side of the front cover and the base.

9. The device holder according to claim 8, wherein the accommodation space penetrates through the front cover and the base along the axis, the inner diameter of the bearing portion decreases as the bearing portion extends farther along the axis away from the front cover, and/or the inner diameter of the pressing portion decreases as the pressing portion extends farther along the axis away from the base.

10. The device holder according to claim 8, wherein the pressing portion comprises a plurality of protruding ribs.

11. The device holder according to claim 8, further comprising a fixing member, and the mount bracket is fixed at any angle relative to the base by the fixing member.

12. A device holder for holding an electronic device comprising:
   a base having a bearing portion, a first closed hole penetrating therethrough, and a pivot bump;
   a front cover having a pressing portion and a second closed hole penetrating therethrough, an axis passing through the first closed hole and the second closed hole in response to the front cover being fixed to the base, the electronic device accommodated in an accommodation space, which is defined by the first closed hole and the second closed hole and arranged between the pressing portion and the bearing portion;
   a pivot pivotally connected to one side of the base and the front cover; and a mount bracket pivotally disposed on the base by the pivot bump.

13. The device holder according to claim 12, wherein the accommodation space penetrates through the front cover and the base along the axis, the inner diameter of the bearing portion decreases as the bearing portion extends farther along the axis away from the front cover, and/or the inner diameter of the pressing portion decreases as the pressing portion extends farther along the axis away from the base.

14. The device holder according to claim 12, wherein the pressing portion comprises a plurality of protruding ribs.

15. The device holder according to claim 12, further comprising an engaging structure disposing between the front cover and the base.

16. The device holder according to claim 12, further comprising a fixing member, and the mount bracket is fixed at any angle relative to the base by the fixing member.

\* \* \* \* \*